UNITED STATES PATENT OFFICE.

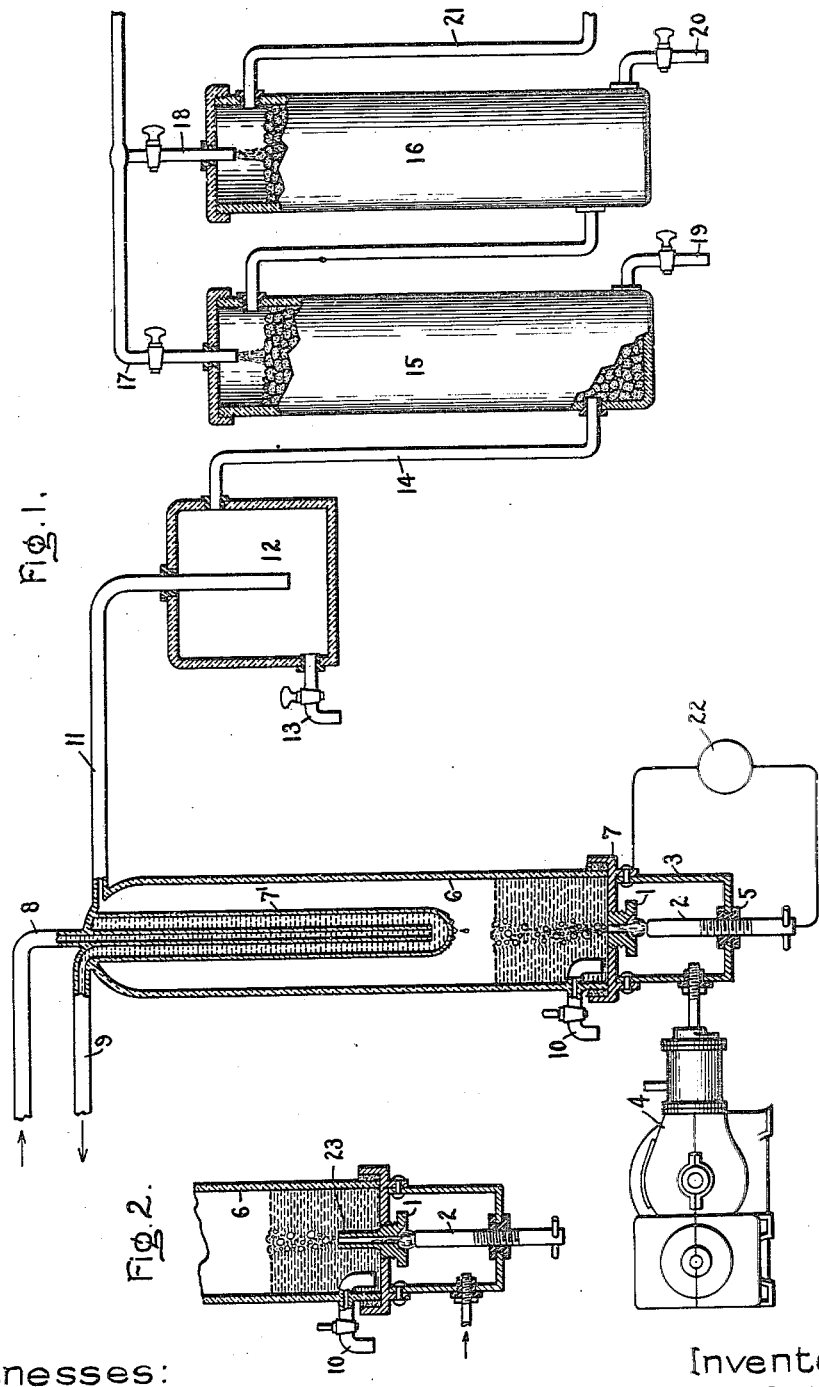

JOSEPH L. R. HAYDEN, OF SCHENECTADY, NEW YORK, ASSIGNOR TO GENERAL ELECTRIC COMPANY, A CORPORATION OF NEW YORK.

PROCESS AND APPARATUS FOR PRODUCING CHEMICAL REACTIONS.

1,046,421. Specification of Letters Patent. Patented Dec. 3, 1912.

Application filed February 13, 1909. Serial No. 477,768.

*To all whom it may concern:*

Be it known that I, JOSEPH L. R. HAYDEN, a citizen of the United States, residing at Schenectady, county of Schenectady, State of New York, have invented certain new and useful Improvements in Processes and Apparatus for Producing Chemical Reactions, of which the following is a specification.

My invention relates to the production of chemical reactions in a mixture of gases by means of an electric arc.

It is well known that certain compounds and elements which are inert with respect to one another under ordinary conditions can be made to interact with a formation of new compounds when subjected to the influence of an electric arc. For example, the gases oxygen and nitrogen, which appear as a mixture in atmospheric air, combine when passed through an electric arc to form nitric oxid. The reaction, however, is a reversible one, and unless the nitric oxid is cooled very rapidly to a temperature below a certain dissociating temperature, the reverse reaction takes place and nitric oxid is again decomposed into its elements nitrogen and oxygen. If reactions of the nature above indicated are, therefore, to be carried out efficiently, means must be provided to cool the reaction mixture to a temperature below the dissociating temperature of the product immediately after having passed through the influence of the arc.

My invention relates more specifically to the method of cooling the gases after having been acted upon by the arc, and the apparatus for accomplishing this cooling most efficiently. For this purpose the gases are passed rapidly into a liquid having a high thermal capacity, such as water. A receptacle containing the liquid through which the gases are passing is preferably provided with a condenser, so as to condense the vapors from the liquid which may be brought to a boiling temperature by the heated gases from the arc.

The accompanying drawings show somewhat diagrammatically an embodiment of my invention, in which the reaction mixture is blown into a body of water through a perforation in one of the arcing electrodes.

Figure 1 shows the apparatus for carrying out the reaction, together with the accessory apparatus for completing the reactions and absorbing the products; Fig. 2 is a fragmentary view, showing a slightly modified form of perforated electrode, which projects a short way into the cooling liquid.

Referring to Fig. 1, the arc is formed between the perforated electrode 1 and the electrode 2, which is adjustable. The arc is surrounded by a pressure chamber 3, which communicates with a blower 4. The electrode 2 is insulated from the pressure chamber by means of a suitable bushing 5. The perforated electrode communicates with a container 6, containing a cooling liquid, as water. The bottom 7 of the container is preferably made of metal, which may be similar to the metal composing the perforated electrode. Copper is well suited for this purpose, as it has good heat conductivity, and the electrode which is made the anode is not consumed to any great extent by the arc. The upper vertical portion of the container may be preferably made of glass. The joint between the lower base portion and the upper portion is packed watertight, as indicated in the drawing. The container 6 is provided with a reëntrant portion 7' forming a condenser through which a flow of cooling liquid is maintained, supplied by inlet pipe 8 and carried away by outlet pipe 9. The lower electrode 2, which is preferably made the cathode of the arc, may be made of iron, or some metal readily supplying vapors to maintain the arc. The container 6 is provided with an outlet pipe 10 for the introduction and removal of the cooling liquid. The chamber 6 communicates by means of the pipe 11 with a chamber 12, known as the "reaction chamber," in which the reaction is allowed to proceed, the nitric oxid combining with the free oxygen present to form the higher oxids of nitrogen. This reaction chamber is likewise provided with an outlet pipe 13, for the removal of any liquids which may be condensed in the chamber. It communicates by means of pipe 14 with absorbing tanks 15 and 16. Only two absorbing towers have been shown for illustration, but a larger number can be used to advantage. The reaction chamber and the absorbing tanks are made of some suitable material, such as stoneware, which is not attacked by the acid formed therein. The tanks 15 and 16 are filled with some vitreous material not attacked by acids, upon which a film of moisture is maintained by water percolating over the material. The water is supplied by pipes 17 and 18, respectively. The acid formed in these chambers by the solution of the gases is tapped off through the pipes 19, 20; the uncombined excess gases escaping to the atmosphere through pipe 21. The electrodes 1 and 2 are connected to some suitable source of current, such as a generator 22.

According to the modification illustrated in Fig. 2, electrode 1 has an elongated portion 23 projecting into the cooling liquid; but in other respects the various parts are identical with that already described in connection with Fig. 1.

The method of operation is as follows: The cooling chamber 6 being filled with water, and air under pressure being supplied by blower 4 to the pressure chamber 3, so as to prevent the water from flowing down from the perforated electrode 1, an arc is drawn between the electrodes 1 and 2 by bringing them in contact and separating them. The arc should be made as short as is possible with its steady maintenance. The gas mixture, after passing through the arc, bubbles up through the water and is cooled thereby. The gases then pass on to the reaction chamber, where the reaction is completed, as already explained. The gases are carried on into the absorption chamber, where they come in contact with water and form nitrous and nitric acid. Very little absorption of the gases by the water with the formation of acid occurs in the chamber 6. The nitric oxid, apparently, requires an appreciable time to combine with the surplus oxygen so as to form the higher oxids, which alone can interact with water to form acid. The use of metal for the base and the perforated electrode, therefore, is not objectionable.

By the above method of cooling the reaction mixture after passing through the arc, a greater yield is obtained than by any of the methods now in use.

Other means for forcing the reaction mixture through the arc and the cooling liquid, can be used. The gases can be carried through by applying suction at the pipe 21, or, in general, at the end of the condensing apparatus.

What I claim as new and desire to secure by Letters Patent of the United States, is,—

1. The process which consists in passing a gaseous reaction mixture into an arc and withdrawing the reaction mixture in the direction of the arc stream into immediate contact with a body of liquid, thereby rapidly cooling said mixture in a greatly subdivided state by contact with said liquid.

2. The combination of a receptacle containing liquid, arcing electrodes, one of which contains a perforation opening into said container, and means for passing a reaction mixture through the arc formed between said electrodes and bringing it at once in contact with a liquid in said receptacle.

3. The combination of arcing electrodes, one of which is perforated, a liquid-containing vessel communicating with said perforated electrode, and means for passing a gaseous mixture through an arc between said electrodes and through a liquid in said vessel.

4. The combination of coöperating electrodes, an inclosed vessel containing a liquid, means for urging a gaseous mixture through an arc formed between said electrodes and into the body of liquid.

In witness whereof, I have hereunto set my hand this 12th day of February, 1909.

JOSEPH L. R. HAYDEN.

Witnesses:
BENJAMIN B. HULL,
HELEN ORFORD.